(12) United States Patent
Moshayedi et al.

(10) Patent No.: US 8,572,308 B2
(45) Date of Patent: Oct. 29, 2013

(54) SUPPORTING VARIABLE SECTOR SIZES IN FLASH STORAGE DEVICES

(75) Inventors: Mark Moshayedi, Newport Coast, CA (US); William Calvert, Cranleigh (GB); Stephen Russell Boorman, Bookham (GB); Simon Mark Haynes, Send (GB)

(73) Assignee: STEC, Inc., Santa Ana, CA (US)

( * ) Notice: Subject to any disclaimer, the term of this patent is extended or adjusted under 35 U.S.C. 154(b) by 995 days.

(21) Appl. No.: 12/492,103

(22) Filed: Jun. 25, 2009

(65) Prior Publication Data
US 2010/0042901 A1  Feb. 18, 2010

Related U.S. Application Data

(60) Provisional application No. 61/075,709, filed on Jun. 25, 2008.

(51) Int. Cl.
*G06F 12/00* (2006.01)
(52) U.S. Cl.
USPC ............ 711/103; 714/773; 714/E12.19
(58) Field of Classification Search
USPC ............................. 714/773; 711/103
See application file for complete search history.

(56) References Cited

U.S. PATENT DOCUMENTS

| | | | |
|---|---|---|---|
| 5,822,781 A | 10/1998 | Wells et al. | |
| 6,426,893 B1 | 7/2002 | Conley et al. | |
| 6,449,111 B1 | 9/2002 | Kool et al. | |
| 6,959,311 B2 | 10/2005 | Schofield | |
| 7,032,065 B2 | 4/2006 | Gonzalez et al. | |
| 7,793,068 B2 | 9/2010 | Sinclair et al. | |
| 2007/0156998 A1 | 7/2007 | Gorobets | |
| 2008/0098192 A1 | 4/2008 | Im et al. | |
| 2009/0157950 A1 | 6/2009 | Selinger | |

OTHER PUBLICATIONS

Gal et al., "Algorithms and Data Structures for Flash Memories", ACM Computing Surveys, Jun. 2005, pp. 138-163, vol. 37.
Gal et al., "Mapping Structures for Flash Memories: Techniques and Open Problems", swste, pp. 83-92, IEEE International Conference on Software—Science, Technology & Engineering (SwSTE '05), 2005.

*Primary Examiner* — Reginald Bragdon
*Assistant Examiner* — Hamdy S Ahmed
(74) *Attorney, Agent, or Firm* — McDermott Will & Emery LLP

(57) ABSTRACT

A flash storage device comprises a plurality of data blocks, each data block comprising a plurality of data segments, a system memory, and a controller. The controller is configured to cache in the system memory a plurality of data sectors to be written, to write to a first one of the plurality of data segments a first one of the plurality of data sectors, to write to the first one of the plurality of data segments a first portion of a second one of the plurality of data sectors, and to write to a second one of the plurality of data segments a second portion of the second one of the plurality of data sectors.

30 Claims, 5 Drawing Sheets

SUPPORTING VARIABLE SECTOR SIZES IN FLASH STORAGE DEVICES

CROSS-REFERENCE TO RELATED APPLICATION

The present application claims the benefit of priority under 35 U.S.C. §119 from U.S. Provisional Patent Application Ser. No. 61/075,709, entitled "SOLID STATE DEVICE," filed on Jun. 25, 2008, the disclosure of which is hereby incorporated by reference in its entirety for all purposes.

FIELD OF THE INVENTION

The present invention relates to flash storage devices and, in particular, relates to supporting variable sector sizes in flash storage devices.

BACKGROUND OF THE INVENTION

Flash memory is an improved form of Electrically-Erasable Programmable Read-Only Memory (EEPROM). Traditional EEPROM devices are only capable of erasing or writing one memory location at a time. In contrast, flash memory allows multiple memory locations to be erased or written in one programming operation. Flash memory can thus operate at higher effective speeds than traditional EEPROM.

Flash memory enjoys a number of advantages over other storage devices. It generally offers faster read access times and better shock resistance than a hard disk drive (HDD). Unlike dynamic random access memory (DRAM), flash memory is non-volatile, meaning that data stored in a flash storage device is not lost when power to the device is removed. For this reason, a flash memory device is frequently referred to as a flash storage device, to differentiate it from volatile forms of memory. These advantages, and others, may explain the increasing popularity of flash memory for storage applications in devices such as memory cards, USB flash drives, mobile phones, digital cameras, mass storage devices, MP3 players and the like.

A host system to which a flash storage device is attached may send and receive data to and from the flash storage device in data sectors. The particular size of a data sector is usually determined by the host device. Some host devices utilize data sectors with a size of $2^n$ bits, where n is a positive integer (e.g., 32 bits, 64 bits, 128 bits, 256 bits, 512 bits, 1024 bits, 2048 bits, etc.). Other host devices may use data sectors with non-standard sizes other than $2^n$ bits, such as 520 bits, 524 bits, 528 bits, etc. As the size of a data segment in a flash storage device is determined at the time of manufacture, and is usually also a size of $2^n$ bits (e.g., 1K, 2K, 4K, 8K, 16K, etc.), efficiently accommodating host devices that use non-standard data sectors presents a challenge. In this regard, storing larger, non-standard size data sectors in a flash storage device may leave a significant portion of the potential storage space thereof unused.

SUMMARY OF THE INVENTION

Various aspects of the subject disclosure solve the foregoing problem by providing flash storage devices the capability to store non-standard size data sectors while maximizing the host-addressable storage space in the flash storage device. The flash storage devices may be configured to treat each data block therein as a continuous media, wherein data sectors may be written such that they span a boundary between adjacent data segments.

According to one aspect of the subject disclosure, a flash storage device comprises a plurality of data blocks, each data block comprising a plurality of data segments, a system memory, and a controller. The controller is configured to cache in the system memory a plurality of data sectors to be written, to write to a first one of the plurality of data segments a first one of the plurality of data sectors, to write to the first one of the plurality of data segments a first portion of a second one of the plurality of data sectors, and to write to a second one of the plurality of data segments a second portion of the second one of the plurality of data sectors.

According to another aspect of the subject disclosure, a method of writing data to a flash storage device comprises the steps of caching in a system memory a plurality of data sectors to be written, writing a first one of the plurality of data sectors to a first data segment, writing a first portion of a second one of the plurality of data sectors to the first data segment, and writing a second portion of the second one of the plurality of data sectors to a second data segment.

According to another aspect of the subject disclosure, a machine readable medium carries one or more sequences of instructions for writing data to a flash storage device. Execution of the one or more sequences of instructions by one or more processors causes the one or more processors to perform the steps of caching in a system memory of the flash storage device a plurality of data sectors to be written, writing a first one of the plurality of data sectors to a first data segment of the flash storage device, writing a first portion of a second one of the plurality of data sectors to the first data segment, and writing a second portion of the second one of the plurality of data sectors to a second data segment of the flash storage device.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
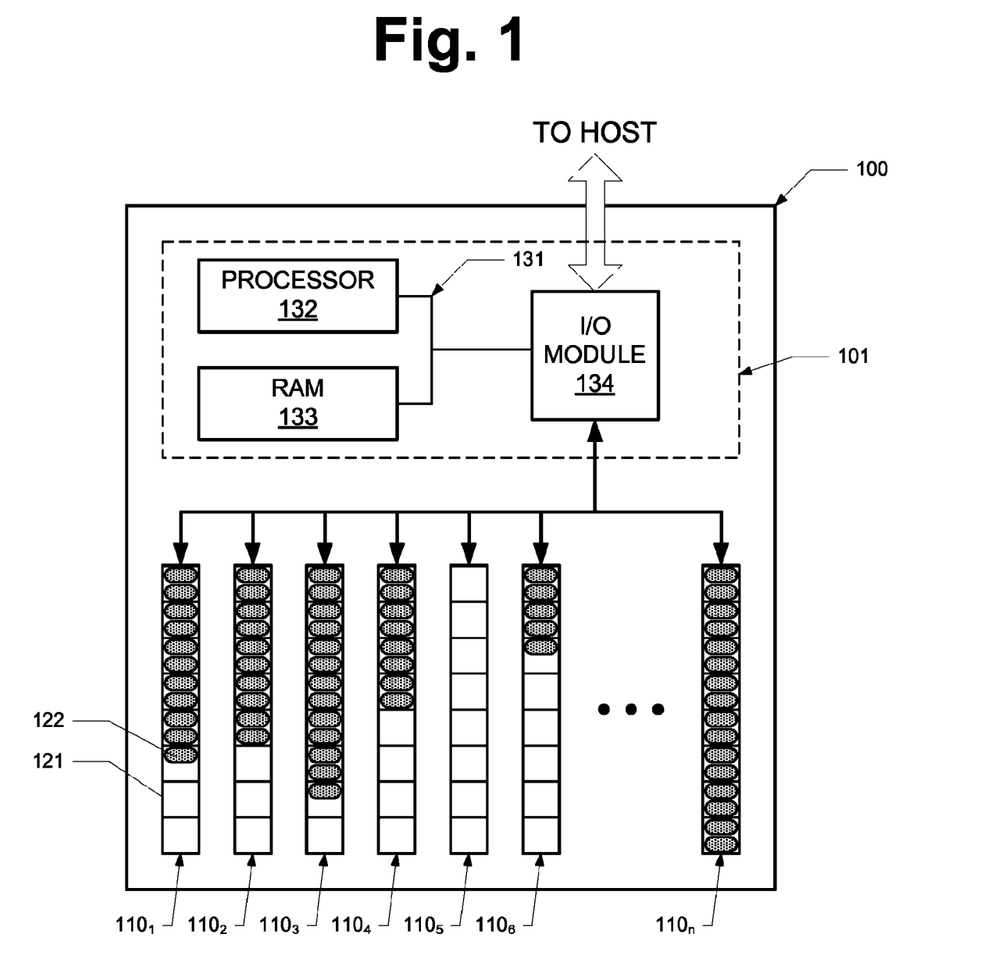
FIG. 1 illustrates a flash storage device in accordance with one aspect of the subject disclosure.

Referring to FIG. 1, a block diagram of a flash storage device according to one aspect of the subject disclosure is depicted. Flash storage device 100 includes a controller 101 and a number of non-volatile data blocks $110_1$, $110_2$, $110_3$, $110_4$, $110_5$, $110_6$ ... $110_n$. While the term "data block" is used throughout the description, it will be understood by those of skill in the art that the term data block is frequently used interchangeably with the term "memory block" in the art. Each data block has a plurality of data segments for storing data, such as data segment 121. In the present exemplary flash storage device, each data block is illustrated as including 8 data segments. The scope of the present invention, however, is not limited to such an arrangement. Rather, as will be apparent to one of skill in the art, a data block may be configured with more or less than 8 data segments as desired to provide various levels of storage space. For example, in accordance with one aspect of the subject disclosure, a data block may include 32 data segments of 4 kilobytes (kB) each to provide 128 kB of data storage.

While data blocks are usually configured with $2^n$ data segments (e.g., 16, 32, 64, 128, 256, etc.), the scope of the invention is not so limited. Similarly, while each data block $110_1$-$110_n$ is illustrated as including the same number of data segments, the scope of the invention is not so limited, as a flash storage device may comprise a number of data blocks with differing capacities and/or numbers of data segments. In accordance with one aspect of the subject disclosure, a data block may span over more than one flash memory chip in a storage array of multiple chips. In accordance with another aspect, a data block is stored on a single flash memory chip in a storage array of multiple flash memory chips.

Controller 101 includes a bus 131 or other communication mechanism for communicating information, and a processor 132 coupled with bus 131 for processing information. Controller 101 also includes a volatile memory such as random access memory (RAM) 133 coupled to bus 131 for storing information and instructions to be executed by processor 132. RAM 133 may also be used for storing temporary variables or other intermediate information during execution of instructions by processor 132. According to one aspect of the subject disclosure, RAM 133 may comprise one or more DRAM or RAM modules. Controller 101 may be coupled via I/O module 134 to data blocks $110_1$-$110_n$, and to an external system with which flash storage device 100 communicates.

In accordance with one aspect of the subject disclosure, a host system may send and receive data to and from the flash storage device 100 in data sectors. For example, each data sector may be 512 bytes in size with eight data sectors per 4 K byte data segment. For simplicity, data sectors, such as data sector 122, are illustrated in FIG. 1 as about half the size of a data segment (e.g., two 512 byte data sectors per 1K data segment). The particular size of a data sector is usually determined by the host device to which a flash storage device is attached. Some host devices utilize data sectors with a size of $2^n$ bits, where n is a positive integer (e.g., 32 bits, 64 bits, 128 bits, 256 bits, 512 bits, 1024 bits, 2048 bits, etc.). Other host devices use data sectors with non-standard sizes other than $2^n$ bits, such as 520 bits, 524 bits, 528 bits, etc. As the size of a data segment in a flash storage device is determined at the time of manufacture, and is usually also a size of $2^n$ bits (e.g., 1K, 2K, 4K, 8K, 16K, etc.), efficiently accommodating host devices that use non-standard data sectors presents a challenge.

Figure 2:
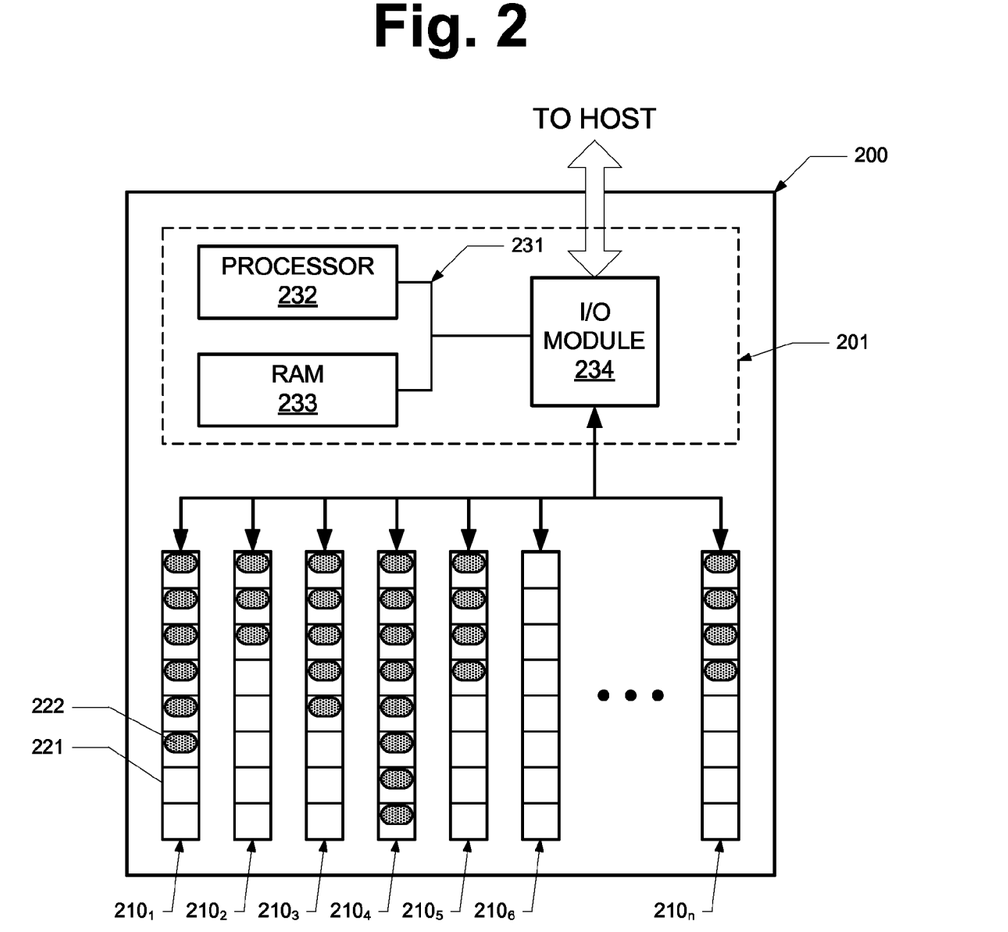
FIG. 2 illustrates a flash storage device in accordance with one aspect of the subject disclosure.

For example, FIG. 2 illustrates a flash storage device in which larger, non-standard size data sectors are inefficiently stored. Flash storage device 200 includes a controller 201 and a number of non-volatile data blocks $210_1$, $210_2$, $210_3$, $210_4$, $210_5$, $210_6$ ... $210_n$. Controller 201 includes a bus 231 or other communication mechanism for communicating information, and a processor 232 coupled with bus 231 for processing information. Controller 201 also includes a volatile memory such as random access memory (RAM) 233 coupled to bus 231 for storing information and instructions to be executed by processor 232. Controller 201 may be coupled via I/O module 234 to data blocks $210_1$-$210_n$, and to an external system with which flash storage device 200 communicates. Each data block $210_1$-$210_n$ has a plurality of data segments for storing data, such as data segment 221. As can be seen with reference to FIG. 2, storing a larger, non-standard size data sector such as data sector 222 in a data segment leaves a significant portion of the storage space of the data segment unused. In this regard, if data sector 222 were a 520 byte data sector, and the data segments of flash storage device 200 were capable of storing 1K of data, then storing a single data sector in one data segment would waste 504 bytes of storage space. While some of that storage space might be used to store LBA information or ECC information corresponding to the data sector, the inefficiency of this storage system would still reduce the host-addressable storage space of flash storage device 200 by more than 40%.

Figure 3:
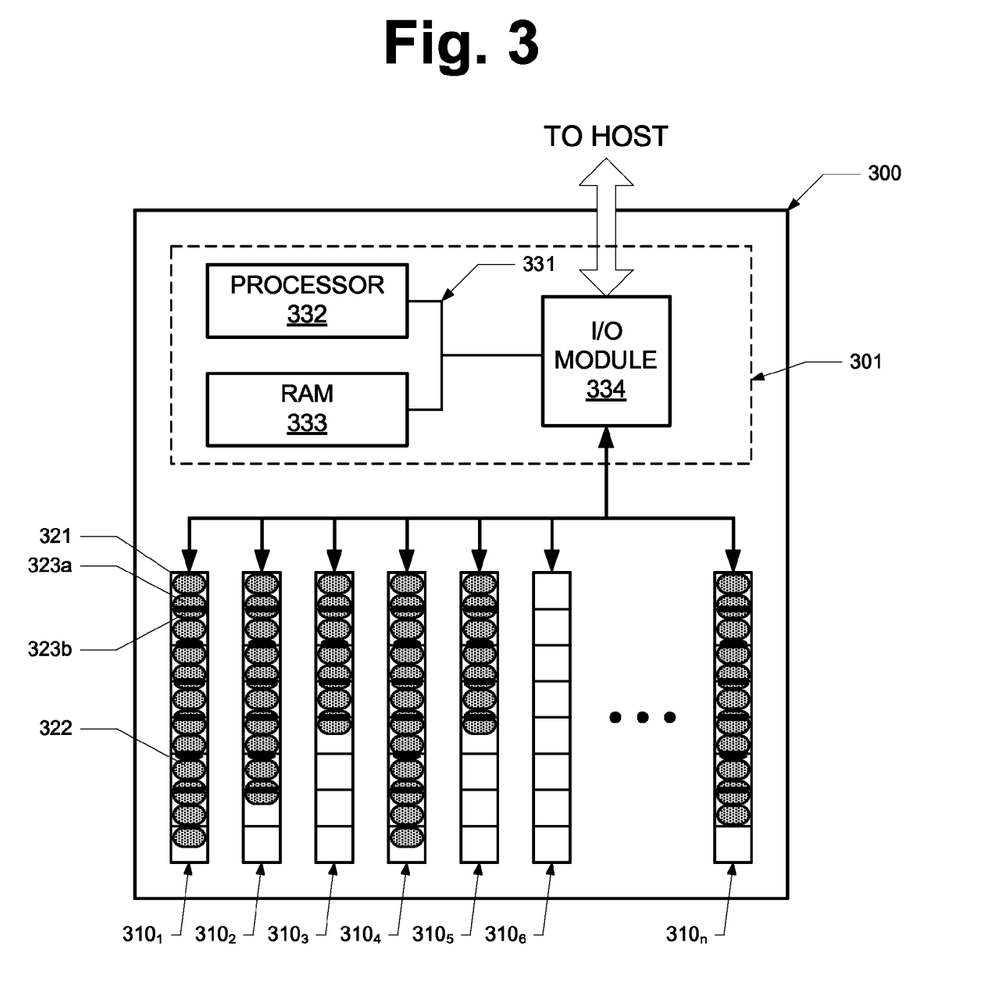
FIG. 3 illustrates a flash storage device in accordance with one aspect of the subject disclosure.

To address these inefficiencies, a flash storage device may be configured to treat a data block as a continuous medium, whereby data sectors can be split over the boundary between adjacent data segments. FIG. 3 illustrates a flash storage device so configured, in accordance with one aspect of the subject disclosure. Flash storage device 300 includes a controller 301 and a number of non-volatile data blocks $310_1$, $310_2$, $310_3$, $310_4$, $310_5$, $310_6$ ... $310_n$. Controller 301 includes a bus 331 or other communication mechanism for communicating information, and a processor 332 coupled with bus 331 for processing information. Controller 301 also includes a volatile memory such as random access memory (RAM) 333 coupled to bus 331 for storing information and instructions to be executed by processor 332. Controller 301 may be coupled via I/O module 334 to data blocks $310_1$-$310_n$, and to an external system with which flash storage device 300 communicates. Each data block $310_1$-$310_n$ has a plurality of data segments for storing data, such as data segment 321. As can be seen with reference to FIG. 3, a data segment may include multiple whole and/or partial data sectors to more efficiently utilize the space therein. For example, data segment 321 includes a whole data sector and a portion 323a of a second data sector. The remaining portion 323b of the second data sector is written to an adjacent or subsequent data segment, such that both portions span the boundary between the data segments.

Data may be written to the array of data blocks $310_1$-$310_n$ on a segment-by-segment level (e.g., in many flash storage devices, the data segment is the smallest unit of flash memory which can be written in a single operation). Accordingly, upon receiving multiple data sectors to be written, controller 301 may be configured to cache a data segment's worth of data sectors in a buffer and then write the contents of the buffer to a desired physical page. In accordance with one aspect of the subject disclosure, controller 301 may be configured to begin caching a data sector, such as the data sector of which portion 323a is a part, and to stop adding information from that data sector to the buffer once the buffer is filled (e.g., once portion 323a is added to the cache). Once the buffer is full, controller 301 may be configured to copy the contents of the buffer (e.g., one or more complete data sectors and portion 323a) to data segment 321, to clear the buffer, and to resume caching information from the data sector where it previously left off. In this regard, controller 301 may be configured to cache information from the data sector of which portion 323a and 323b are parts beginning with portion 323b. Controller 301 continues in this fashion to copy information from multiple data sectors received from a host device into a buffer until the buffer is full, to copy the buffer to a data segment, to erase the buffer, and to resume caching where it left off.

In this regard, flash storage device 300 may further include a buffer operably coupled to data blocks $310_1$-$310_n$. The buffer may be the same size as the data segments of data blocks $310_1$-$310_n$, and receives data to be written to a particular data segment therein from controller 301. In this regard, the buffer acts as an intermediary between controller 301 and data blocks $310_1$-$310_n$, inasmuch as controller 301 sends data to be written to a particular data segment to buffer 340, which in turn copies the data to the desired data segment. According to one aspect of the subject disclosure, the buffer may be provided on a flash memory chip in which data blocks $310_1$-$310_n$ are disposed. According to one aspect of the subject disclosure, each flash memory chip in an array of memory chips may have a buffer for interfacing with the data blocks of the chip on which it is provided. According to yet another aspect of the subject disclosure, the buffer may be implemented in RAM 333.

Accordingly, while the data segment may remain the smallest unit of flash memory which can be written in a single operation, configuring controller 301 in this fashion allows controller 301 to treat each data block as a continuous media, greatly improving the efficiency with which the space available in a data block is utilized.

To facilitate this arrangement, an addressing table may be maintained in RAM 333, where logical addresses (e.g., LBAs) for each data sector are correlated with physical locations in the array of data blocks. According to one aspect of the subject disclosure, the addressing table may be configured to maintain for each data sector an identifier indicating in which data block it is stored, and an ordinal number indicating its position in the data block. For example, in the addressing table, data sector 321 may be associated with an indicator indicating that it is stored in data block $310_1$, and the ordinal number 0 indicating that it is offset 0 bytes from the first position in the data block. Similarly, the data sector of which portions 323a and 323b are parts may be associated with an indicator indicating that it is stored in data block $310_1$, and the ordinal number 1, which indicates it is offset 1 data sector's worth of bytes from a first position in the data block. As the number of bytes in a data sector may be provided to controller 301 a priori, it is a trivial matter for controller 301 to calculate a particular physical address in data block $310_1$ where this data sector begins. As controller 301 is further aware of the location of the boundaries between adjacent data segments in data block $310_1$, when controller 301 is requested to read the data in the data sector of which portions 323a and 323b are parts, controller 301 may read the relevant regions of data segment 321 and the following data segment (in which portion 323b is stored) and reconstruct the data sector from portions 323a and 323b.

According to one aspect of the subject disclosure, by overflowing an unwritten portion of a data sector to an adjacent data segment, the addressing table in RAM 333 can easily locate the data thereof with only the indicator and offset described in greater detail above. However, in some aspects of the subject disclosure, data from a data sector which does not all fit within a single data segment may be split between non-adjacent data segments, and the addressing table provided with multiple indicators indicating the location of each portion.

Figure 4:
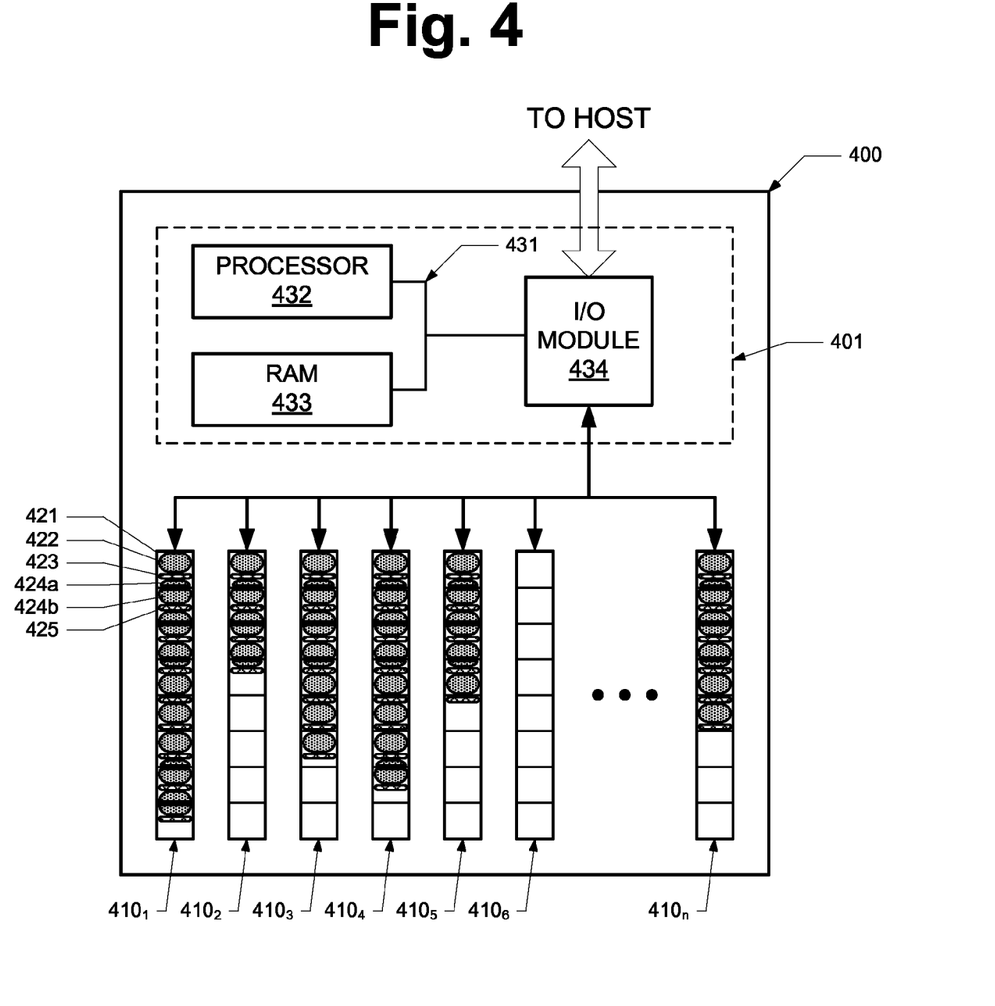
FIG. 4 illustrates a flash storage device in accordance with one aspect of the subject disclosure.

In accordance with one aspect of the subject disclosure, a flash storage device may also be configured to write error correction information (e.g., ECC data) corresponding to each data sector in the same data segment in which the data sector is written. When a data sector is written to more than one data segment, however (e.g., when a data sector spans the boundary between two data segments), the flash storage device may be configured to write the error correction information to the data segment in which the last portion of the data sector is written. FIG. 4 illustrates one such flash storage device in accordance with one aspect of the subject disclosure. Flash storage device 400 includes a controller 401 and a number of non-volatile data blocks $410_1$, $410_2$, $410_3$, $410_4$, $410_5$, $410_6$ ... $410_n$. Controller 401 includes a bus 431 or other communication mechanism for communicating information, and a processor 432 coupled with bus 431 for processing information. Controller 401 also includes a volatile memory such as random access memory (RAM) 433 coupled to bus 431 for storing information and instructions to be executed by processor 432. Controller 401 may be coupled via I/O module 434 to data blocks $410_1$-$410_n$, and to an external system with which flash storage device 400 communicates. Each data block $410_1$-$410_n$ has a plurality of data segments for storing data, such as data segment 421.

As can be seen with reference to FIG. 4, a data segment may include multiple whole and/or partial data sectors to more efficiently utilize the space therein. For example, data segment 421 includes a whole data sector 422 and a portion 424a of a second data sector. The remaining portion 424b of the second data sector is written to an adjacent or subsequent data segment, such that both portions span the boundary between the data segments. As can further be seen with reference to FIG. 4, a data segment may include error correction information corresponding to a data sector stored either entirely or partially therein. In this regard, data may be written to the array of data blocks $410_1$-$410_n$ on a segment-by-segment level (e.g., in many flash storage devices, the data segment is the smallest unit of flash memory which can be written in a single operation). Accordingly, upon receiving multiple data sectors to be written, controller 401 may be configured to cache a first data sector 422 in the buffer, to generate error correction information 423 based on the first data sector 422 and cache the error correction information 423 in the buffer, to begin caching a second data sector, such as the data sector of which portion 424a is a part, to generate error correction information based on portion 424a, and to stop adding information from that data sector to the buffer once the buffer is filled (e.g., once portion 424a is added to the cache).

Once the buffer is full, controller 401 may be configured to copy the contents of the buffer to a data segment, such as data segment 421, to clear the buffer, and to resume caching information from the data sector where it previously left off. In this regard, controller 401 may be configured to cache information from the data sector of which portion 424a and 424b are parts, beginning with portion 424b, and to continue generating error correction information based on portion 424b. Once portion 424b is finished caching, and the error correction information 425 pertaining to the data sector of which portions 424a and 424b are parts, error correction information 425 is cached and, when the buffer is full, the next data segment is written. Controller 401 continues in this fashion to copy information from multiple data sectors received from a host device into a buffer, together with error correction information pertaining thereto, until the buffer is full, to copy the buffer to a data segment, to erase the buffer, and to resume caching and generating error correction information where it left off.

Figure 5:
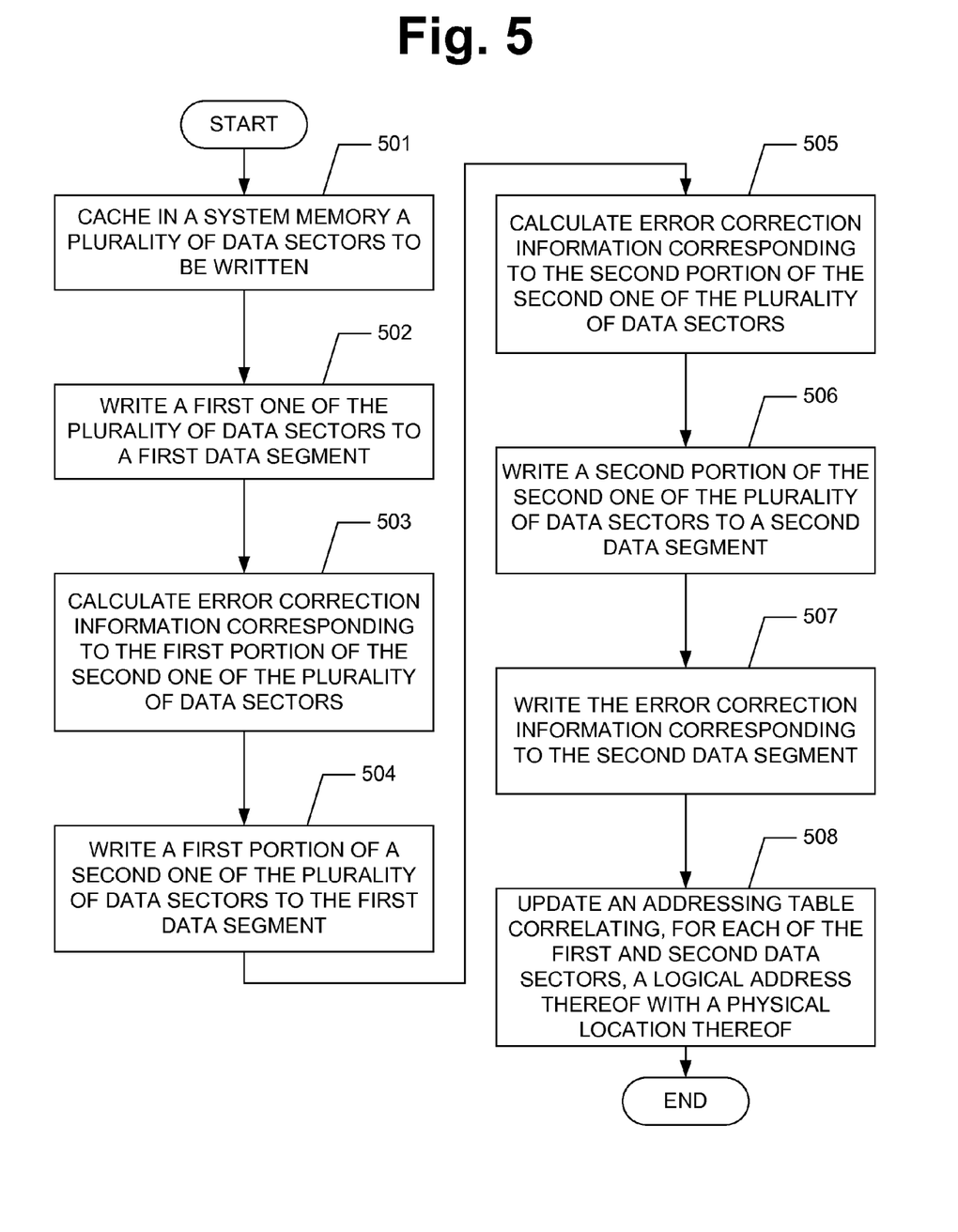
FIG. 5 is a flow chart illustrating a method of writing data to a flash storage in accordance with one aspect of the subject disclosure.

FIG. 5 is a flow chart illustrating a method of writing data in a flash storage device in accordance with one aspect of the subject disclosure. The method begins with step 501, in which a plurality of data sectors to be written are cached in a system memory of the flash storage device. In step 502, a first one of the plurality of data sectors is written to a first data segment. In step 503, error correction information corresponding to the first portion of the second one of the plurality of data sectors is calculated. In step 504, a first portion of a second one of the plurality of data sectors is written to the first data segment. In step 505, error correction information corresponding to the second portion of the second one of the plurality of data sectors is calculated. In step 506, a second portion of the second one of the plurality of data sectors is written to a second data segment. In step 507, the error correction information corresponding to the first and second portions of the second one of the plurality of data sectors is written to the second data segment. In step 508, an addressing table correlating, for each of the plurality of data sectors, a logical address thereof with a physical location thereof in a corresponding one of a plurality of data blocks is updated.

Returning to FIG. 4, writing data in a flash storage device may be performed by controller 401 in response to processor 432 executing one or more sequences of one or more instructions contained in a machine-readable media, such as RAM 433, or another volatile or non-volatile media, according to one aspect of the present invention. Such instructions may be read into the machine-readable media from another medium, such as through I/O module 434. Execution of the sequences of instructions contained in the machine-readable media causes processor 432 to perform the process steps described herein. One or more processors in a multi-processing arrangement may also be employed to execute the sequences of instructions contained in the machine-readable media. In alternative embodiments, hard-wired circuitry may be used in place of or in combination with software instructions to implement various embodiments of the present invention. Thus, embodiments of the present invention are not limited to any specific combination of hardware circuitry and software.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A flash storage device, comprising:
   a plurality of data blocks, each data block comprising a plurality of data segments;
   a system memory, and
   a controller configured to:
      cache in the system memory a plurality of data sectors to be written;
      write to a first one of the plurality of data segments a first one of the plurality of data sectors;
      write to the first one of the plurality of data segments a first portion of a second one of the plurality of data sectors; and
      write to a second one of the plurality of data segments a second portion of the second one of the plurality of data sectors.

2. The flash storage device according to claim 1, wherein the controller is further configured to:
   calculate error correction information corresponding to the first portion of the second one of the plurality of data sectors before writing the first portion to the first one of the plurality of data segments;
   calculate error correction information corresponding to the second portion of the second one of the plurality of data sectors before writing the second portion to the second one of the plurality of data segments; and
   write the error correction information corresponding to the first and second portions of the second one of the plurality of data sectors to the second one of the plurality of data segments.

3. The flash storage device according to claim 1, wherein the first and second ones of the plurality of data segments are data segments of a same one of the plurality of data blocks.

4. The flash storage device according to claim 1, wherein the first and second ones of the plurality of data segments are adjacent data segments.

5. The flash storage device according to claim 1, wherein the plurality of data sectors to be written each have a same size of $2^n$ bits, where n is a positive integer.

6. The flash storage device according to claim 1, wherein the plurality of data sectors to be written each have a same size of other than $2^n$ bits, where n is a positive integer.

7. The flash storage device according to claim 1, wherein the system memory includes an addressing table correlating, for each of the plurality of data sectors, a logical address thereof with a physical location thereof in the corresponding one of the plurality of data blocks.

8. The flash storage device according to claim 7, wherein the physical location for each of the plurality of data sectors comprises an offset from a first position in the corresponding one of the plurality of data blocks.

9. The flash storage device according to claim 1, wherein the system memory comprises a random access memory in the controller.

10. The flash storage device according to claim 1, wherein the system memory comprises one or more buffers provided on one or more flash memory chips in which the plurality of data blocks are disposed.

11. A method of writing data to a flash storage device comprising a plurality of data blocks, each data block comprising a plurality of data segments, the method comprising the steps of:
  caching in a system memory a plurality of data sectors to be written;
  writing a first one of the plurality of data sectors to a first data segment;
  writing a first portion of a second one of the plurality of data sectors to the first data segment; and
  writing a second portion of the second one of the plurality of data sectors to a second data segment.

12. The method according to claim 11, further comprising the steps of:
  calculating error correction information corresponding to the first portion of the second one of the plurality of data sectors before writing the first portion to the first data segment;
  calculating error correction information corresponding to the second portion of the second one of the plurality of data sectors before writing the second portion to the second data segment; and
  writing the error correction information corresponding to the first and second portions of the second one of the plurality of data sectors to the second data segment.

13. The method according to claim 11, wherein the first and second ones of the plurality of data segments are data segments of a same data block.

14. The method according to claim 11, wherein the first and second ones of the plurality of data segments are adjacent data segments.

15. The method according to claim 11, wherein the plurality of data sectors to be written each have a same size of $2^n$ bits, where n is a positive integer.

16. The method according to claim 11, wherein the plurality of data sectors to be written each have a same size of other than $2^n$ bits, where n is a positive integer.

17. The method according to claim 11, further comprising the step of:
  updating an addressing table correlating, for each of the first and second data sectors, a logical address thereof with a physical location thereof in a corresponding one of a plurality of data blocks.

18. The method according to claim 17, wherein the physical location for each of the plurality of data sectors comprises an offset from a first position in the corresponding one of the plurality of data blocks.

19. The method according to claim 17, wherein the system memory comprises a random access memory.

20. The method according to claim 17, wherein the system memory comprises one or more buffers provided on one or more flash memory chips.

21. A non-transitory machine readable medium carrying one or more sequences of instructions for writing data to a flash storage device comprising a plurality of data blocks, each data block comprising a plurality of data segments, wherein execution of the one or more sequences of instructions by one or more processors causes the one or more processors to perform the steps of:
  caching in a system memory of the flash storage device a plurality of data sectors to be written;
  writing a first one of the plurality of data sectors to a first data segment of the flash storage device;
  writing a first portion of a second one of the plurality of data sectors to the first data segment; and
  writing a second portion of the second one of the plurality of data sectors to a second data segment of the flash storage device.

22. The non-transitory machine readable medium according to claim 21, wherein execution of the one or more sequences of instructions by the one or more processors causes the one or more processors to further perform the steps of:
  calculating error correction information corresponding to the first portion of the second one of the plurality of data sectors before writing the first portion to the first data segment;
  calculating error correction information corresponding to the second portion of the second one of the plurality of data sectors before writing the second portion to the second data segment; and
  writing the error correction information corresponding to the first and second portions of the second one of the plurality of data sectors to the second data segment.

23. The non-transitory machine readable medium according to claim 21, wherein the first and second ones of the plurality of data segments are data segments of a same data block of the flash storage device.

24. The non-transitory machine readable medium according to claim 21, wherein the first and second ones of the plurality of data segments are adjacent data segments.

25. The non-transitory machine readable medium according to claim 21, wherein the plurality of data sectors to be written each have a same size of $2^n$ bits, where n is a positive integer.

26. The non-transitory machine readable medium according to claim 21, wherein the plurality of data sectors to be written each have a same size of other than $2^n$ bits, where n is a positive integer.

27. The non-transitory machine readable medium according to claim 21, wherein execution of the one or more sequences of instructions by the one or more processors causes the one or more processors to further perform the step of:
  updating an addressing table correlating, for each of the first and second data sectors, a logical address thereof with a physical location thereof in a corresponding one of a plurality of data blocks.

28. The non-transitory machine readable medium according to claim 27, wherein the physical location for each of the plurality of data sectors comprises an offset from a first position in the corresponding one of the plurality of data blocks.

29. The non-transitory machine readable medium according to claim 21, wherein the system memory comprises a random access memory.

30. The non-transitory machine readable medium according to claim 21, wherein the system memory comprises one or more buffers provided on one or more flash memory chips.

* * * * *